(12) United States Patent
Way et al.

(10) Patent No.: US 7,936,943 B2
(45) Date of Patent: May 3, 2011

(54) CORRECTING LUMINANCE NON-UNIFORMITY IN A TILED PROJECTION SYSTEM

(75) Inventors: Olan C. Way, Corvallis, OR (US); Richard Aufranc, Corvallis, OR (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 973 days.

(21) Appl. No.: 11/824,851

(22) Filed: Jul. 2, 2007

(65) Prior Publication Data

US 2009/0009722 A1 Jan. 8, 2009

(51) Int. Cl.
*G03B 21/26* (2006.01)

(52) U.S. Cl. ............................ 382/274; 353/30; 353/121

(58) Field of Classification Search .................. 382/274; 353/30, 121
See application file for complete search history.

(56) References Cited

U.S. PATENT DOCUMENTS

| 6,921,172 B2 | 7/2005 | Ulichney et al. |
| 7,220,006 B2 * | 5/2007 | Allen et al. ...................... 353/85 |
| 7,364,304 B2 * | 4/2008 | Nomizo et al. .................. 353/30 |
| 7,377,658 B2 * | 5/2008 | Jayaram et al. ................. 353/121 |
| 7,722,190 B2 * | 5/2010 | Weng et al. ..................... 353/31 |
| 2004/0140982 A1 * | 7/2004 | Pate ............................... 345/600 |
| 2005/0052621 A1 * | 3/2005 | Allen et al. ...................... 353/85 |
| 2005/0219467 A1 * | 10/2005 | Nomizo et al. .................. 353/30 |

* cited by examiner

*Primary Examiner* — Jingge Wu
*Assistant Examiner* — Stephen R Koziol

(57) ABSTRACT

A method of correcting luminance non-uniformity in a tiled projection system is disclosed. The method includes projecting with a plurality of projection devices a composite image wherein the composite image comprises a plurality of tiled images on a display surface with an overall luminance and correcting a luminance non-uniformity of the plurality of tiled images, wherein the luminance non-uniformity is based on a dimmed at least one of the plurality of tiled images, wherein correcting the luminance non-uniformity comprises utilizing at least one of the plurality of projection devices to adjust the overall luminance of the plurality of tiled images on the display surface.

18 Claims, 4 Drawing Sheets

---

Projecting with a plurality of projection devices a composite image wherein the composite image comprises a plurality of tiled images on a display surface with an overall luminance.
110

↓

Correcting a luminance non-uniformity of the plurality of tiled images by utilizing at least one of the plurality of projection devices to adjust the overall luminance of the plurality of tiled images on the display surface.
120

Projecting with a plurality of projection devices a composite image wherein the composite image comprises a plurality of tiled images on a display surface with an overall luminance.
110

Correcting a luminance non-uniformity of the plurality of tiled images by utilizing at least one of the plurality of projection devices to adjust the overall luminance of the plurality of tiled images on the display surface.
120

FIG. 1

CORRECTING LUMINANCE NON-UNIFORMITY IN A TILED PROJECTION SYSTEM

BACKGROUND

Tiled projection systems can deliver very high resolution, but it is difficult to hide the seams separating tiles, and output is often reduced to produce uniform tiles. For applications where large pixel counts are desired, such as command and control, tiled projection systems are a common choice. However, registration, color, and brightness must be carefully controlled in a tiled projection system. Matching color and brightness is accomplished by attenuating output, which costs lumens.

Redundancy can be provided in tiled projection systems by aligning images from two or more projectors at the same place on a screen. Consequently, if one projector fails, the other operative projector(s) is still projecting that portion of the overall tiled image. However, the luminance of that portion will be lower than the rest of the tiled image, causing a distraction for the viewer. This is a challenging problem for tiled projection systems.

BRIEF DESCRIPTION OF THE DRAWINGS

FIG. 1 is a flowchart of a method in accordance with an embodiment.

DETAILED DESCRIPTION

Figure 2:
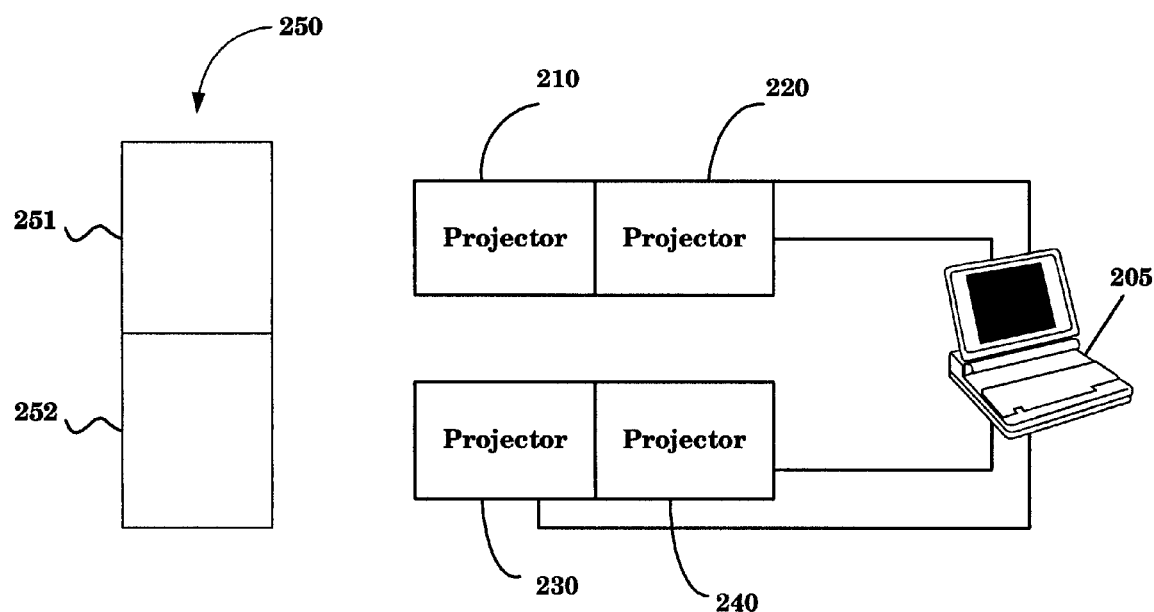
FIG. 2 is an illustration of an exemplary multi-projector system in accordance with an embodiment.

As shown in the drawings for purposes of illustration, a method of correcting luminance non-uniformity in a tiled projection system is disclosed. Luminance is a photometric measurement of the luminous intensity in a given direction and is commonly referred to as brightness. In an embodiment, if the overall luminance of tiled images on a display surface becomes non-uniform due to a dimmed tile, the projector(s) are utilized to automatically adjust the overall luminance in order to maintain luminance uniformity. As a result, the viewer is subjected to minimal distraction.

FIG. 1 is a flowchart of a method in accordance with an embodiment. A first step 110 involves projecting with a plurality of projection devices a composite image wherein the composite image includes a plurality of tiled images on a display surface with an overall luminance. A second step 120 involves correcting a luminance non-uniformity of the plurality of tiled images by utilizing at least one of the plurality of projection devices to adjust the overall luminance of the plurality of tiled images on the display surface. Again, by adjusting the overall luminance of the tiled images on the associated display surface in response to luminance non-uniformity, the viewer is subjected to minimal distraction.

FIG. 2 shows an embodiment of a multi-projector system 200 that includes projectors 210, 220, 230, 240, a computer 205 and a tiled display surface 250. In general, the tiled display surface 250 includes at least two display tiles 251-252 for displaying a substantially tiled image. Here, projectors 210, 220 are redundant with respect to tile 251 and projectors 230, 240 are redundant with respect to tile 252. Although FIG. 2 is shown with 4 projectors and a tiled display surface including 2 display tiles, one of ordinary skill in the art will readily recognize that any number of projectors could be employed in conjunction with any number of display tiles while remaining within the spirit and scope of the present inventive concept.

The computer 205 coordinates the operation of the projectors 210, 220, 230, 240. The computer 205 may be any type of personal computer, portable computer, or workstation computer that includes a processing unit, a system memory, and a system bus that couples the processing unit to the various components of the computer. The processing unit may include one or more processors, each of which may be in the form of any one of various commercially available processors. Generally, each processor receives instructions and data from a read-only memory and/or a random access memory.

The system memory typically includes a read only memory (ROM) that stores a basic input/output system (BIOS) that contains start-up routines for the computer, and a random access memory (RAM). The system bus may be a memory bus, a peripheral bus or a local bus, and may be compatible with any of a variety of bus protocols, including PCI, VESA, Microchannel, ISA, and EISA. The computer 205 also may include a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital versatile disks) also may be used with the computer 205.

A user may interact (e.g., enter commands or data) with the computer 205 using a keyboard and a pointing device. Information may be displayed to the user on a monitor or with other display technologies. In some embodiments, the computer 205 also may include of one or more graphics cards, each of which is capable of driving one or more display outputs that are synchronized to an internal or external clock source.

The projectors 210, 220, 230, 240 may be implemented by a wide variety of different light sources. Exemplary light sources include strongly colored incandescent light projectors with vertical slit filters, laser beam apparatus with spinning mirrors, and computer-controlled light projectors (e.g., LCD-based projectors or DLP-based projectors). In the illustrated embodiments, the light projectors 210, 220, 230, 240 are computer-controlled light projectors that allow the projected light patterns to be dynamically altered using software. In some embodiments, the projectors 210, 220, 230, 240 operate in the visible portion of the electromagnetic spectrum. In other embodiments, the projectors 210, 220, 230, 240 operate in other regions (e.g., infrared or ultraviolet regions) of the electromagnetic spectrum.

Figure 3:
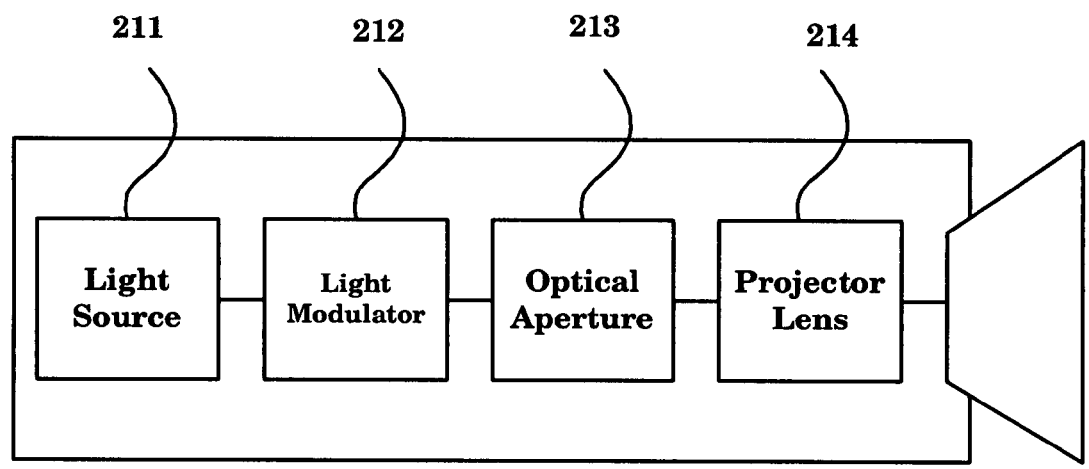
FIG. 3 is a high-level illustration of a projector in accordance with an embodiment.

A high-level illustration of a projector 210 is shown in FIG. 3. As each projector is substantially identical in construction, only the first projector 210 will be described in detail, it being understood that the second, third and fourth projectors 220, 230, 240 are similarly constructed. First projector 210 includes a light source 211, a light modulator 212, an optical aperture 213 and a projector lens 214. During operation, light is transmitted from the light source 211 to the optical aperture 213 via the light modulator 212. Accordingly, the optical aperture 213 determines the angle at which the light enters the projector lens 214 and the brightness of the projected image.

Although the components of the above-described projector 210 components are shown in a specific configuration, one of ordinary skill in the art will readily recognize the components of the projector 210 could be configured in a variety of ways.

When the projectors 210, 220, 230, 240 are functioning properly, the substantially tiled image being projected is uniformly displayed on the tiled display surface 250. However, it is possible that one of the projectors 210, 220, 230, 240 may fail or become inoperative. This may occur if a light modulator within a projector fails or becomes non-functional or for any of a variety of other reasons. Consequently, when one of the projectors fails, one or more of the tiles of the display surface 250 may become dimmer than the remaining tiles.

Figure 4:
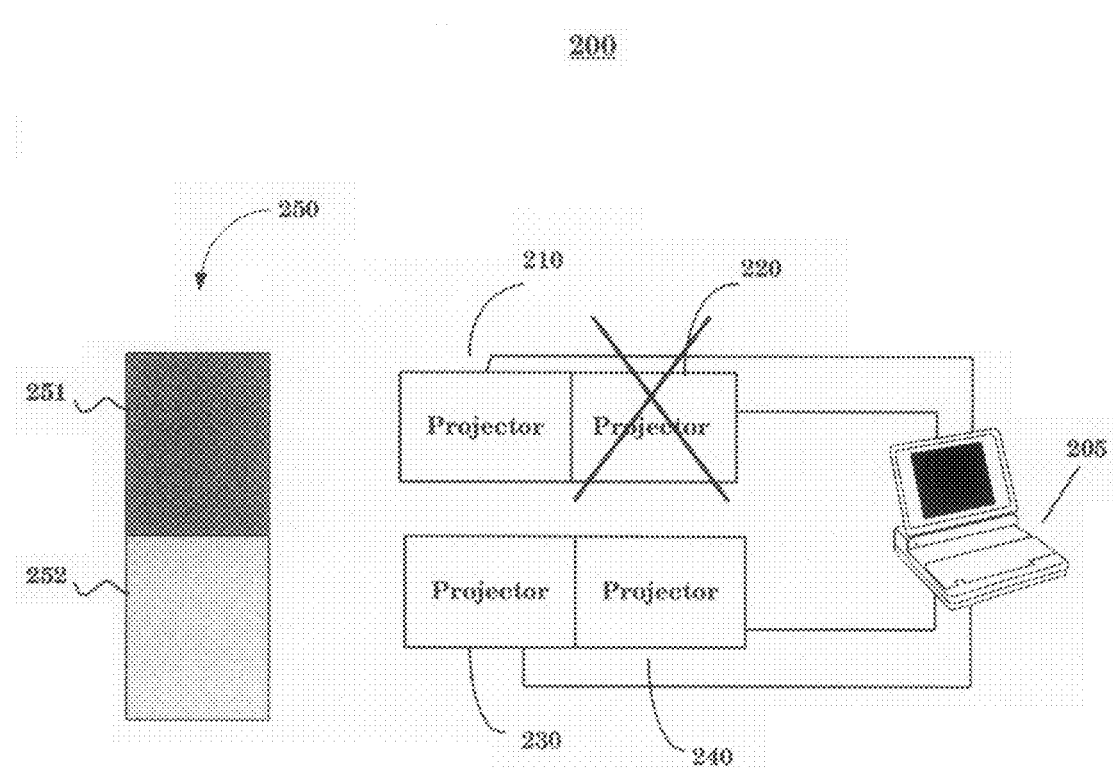
FIG. 4 shows one possible failure example in which the second projector is inoperative.

FIG. 4 shows one possible failure example in which the second projector 220 is inoperative. In this particular example, the failure of the second projector 220 has caused tile 251 to dim with respect to the non-dimmed tile 252. Accordingly, once this failure is detected by the computer 205, luminance correction software within the computer 205 can be implemented to adjust the luminance of the operative projectors 210, 230, 240 in order to account for the visual distraction that is associated with the dimmed tile.

Although the above-delineated embodiment is disclosed in the context of being utilized in conjunction with a computer 205, one of ordinary skill in the art will readily recognize that an independent luminance correction hardware component could be utilized in conjunction with the system while remaining within the spirit and scope of the inventive concept. Accordingly, the luminance correction component would work in combination with independent image processing component of each projector to perform luminance correction in accordance with the outlined embodiments.

Several embodiments are contemplated for adjusting the luminance of the operative projectors 210, 230, 240 in order to account for the dimmed tile. In one embodiment, the operative projectors 210, 230, 240 are utilized to minimize the luminance difference between the non-dimmed tile 252 and the dimmed tile 251. This could involve lowering the overall luminance of the non-dimmed tile 252 to match the luminance of the dimmed tile 251 or raising the overall luminance of the dimmed tile 251 to match the luminance of the non-dimmed tile 252.

Raising the luminance of the dimmed tile to match the luminance of the non-dimmed tile 252 is applicable, for example, if the multi-projector system 200 is running in an "efficient mode" whereby the projectors 210, 220, 230, 240 are not operating at maximum energy consuming capacity. Consequently, if a failure within a projector occurs, the energy output of a redundant projector could be raised in order to raise the luminance of the corresponding dimmed tile 251.

In one embodiment, the optical aperture of at least one of the operative projectors 210, 230, 240 is adjusted to minimize the luminance difference between the non-dimmed tile 252 and the dimmed tile 251. As previously articulated, the optical aperture determines the angle at which the light enters the projector lens. Accordingly, this angle can be adjusted to increase or decrease the amount of light entering the projector lens as needed. Once the dimmed tile is detected, software controls within the computer 205 automatically adjusts the optical aperture of one or more of the projectors in order to lower the overall luminance of the non-dimmed tiles in order to match the luminance of the dimmed tile or raising the luminance of the dimmed tile to match the luminance of the non-dimmed tile 252.

In another embodiment, a video signal of the operative projectors 210, 230, 240 is adjusted to lower the overall luminance of the non-dimmed tiles in order to match the luminance of the dimmed tile. The video signal is the signal being received by each of the projectors 210, 220, 230, 240 from the computer 205 that produces the substantially tiled image. In an embodiment, the video signal of each projector 210, 220, 230, 240 has associated offset, gain and gamma video signal values. Accordingly, one or more of these values can be adjusted to increase or decrease the overall brightness of the associated projector. Consequently, once the dimmed tile is detected, software controls within the computer 205 automatically adjusts one or more the video signal values of one or more of the operative projectors 210, 230, 240 in order to minimize the luminance difference between the non-dimmed tile 252 and the dimmed tile 251. Again, this could include lowering the luminance of the non-dimmed tile 252 in order to match the luminance of the dimmed tile 251 or raising the luminance of the dimmed tile 251 to match the luminance of the non-dimmed tile 252.

In alternate embodiment, the computer 205 utilizes the operative projectors 210, 230, 240 to roll off or ramp down the overall luminance of the non-dimmed tiles in order to match the luminance of the dimmed tile. Rolling off (ramping down) the overall luminance involves utilizing one or more of the operative projectors 210, 230, 240 to "roll" the brightness off of the non-dimmed tile 252 so that the overall luminance of the display 250 more closely matches the luminance of the dimmed tile. This is also referred to as blending the overall luminance to match that of the luminance of the dimmed tile 251. Here, the computer 205 could accomplish this by adjusting either the light source, optical aperture or video signal within one or more of the operative projectors 210, 230, 240.

A method of correcting luminance non-uniformity in a tiled projection system is disclosed. The method includes projecting with a plurality of projection devices a composite image wherein the composite image comprises a plurality of tiled images on a display surface with an overall luminance and correcting a luminance non-uniformity of the plurality of tiled images, wherein the luminance non-uniformity is based on a dimmed at least one of the plurality of tiled images, wherein correcting the luminance non-uniformity comprises utilizing at least one of the plurality of projection devices to adjust the overall luminance of the plurality of tiled images on the display surface. As a result, luminance uniformity can be maintained in the event of the occurrence of a dimmed tile with minimal distraction to the viewer.

The above-described embodiment may also be implemented, for example, by operating a computer system to execute a sequence of computer readable instructions. Accordingly, a computing device typically includes at least some form of computer readable media. Computer readable media can be any available media that can be accessed by a computing device. By way of example, and not limitation, computer readable media may comprise computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by a computing device.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components for correcting luminance non-uniformity in a tiled projection system.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of the inventive concept. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

The invention claimed is:

1. A method of correcting luminance non-uniformity in a tiled projection system comprising;
    projecting with a plurality of projection devices a composite image wherein the composite image comprises a plurality of tiled images on a display surface with an overall luminance, each of the plurality of tiled images being projected by an associated first projection device and an associated second projection device redundant with the associated first projection device; and
    correcting a luminance non-uniformity of the plurality of tiled images, wherein the luminance non-uniformity is based on a dimmed at least one of the plurality of tiled images resulting from a first energy output of the associated first projection device associated with the dimmed at least one of the plurality of tiled images, wherein correcting the luminance non-uniformity comprises raising energy output of the associated second projection device associated with the dimmed at least one of the plurality of tiled images.

2. The method of claim 1 wherein the dimmed at least one of the plurality of tiled images comprises a luminance and utilizing at least one of the plurality of projection devices to adjust the overall luminance of the plurality of tiled images on the display surface further comprises:
    utilizing at least one of the plurality of projection devices to lower the overall luminance to match the luminance of the dimmed at least one of the plurality of tiled images.

3. The method of claim 2 wherein utilizing at least one of the plurality of projection devices to lower the overall luminance to match the luminance of the dimmed at least one of the plurality of tiled images further comprises:
    utilizing at least one of the non-dimmed plurality of projection devices to roll off the overall luminance to match the luminance of the dimmed at least one of the plurality of tiled images.

4. The method of claim 2 wherein each of the plurality of projection devices comprises an optical aperture and utilizing at least one of the plurality of projection devices to lower the overall luminance to match the luminance of the dimmed at least one of the plurality of tiled images further comprises:
    adjusting the optical aperture of at least one of the plurality of projection devices to adjust the overall luminance to match the luminance of the dimmed at least one of the plurality of tiled images.

5. The method of claim 2 wherein each of the plurality of projection devices comprises a light source wherein utilizing at least one of the plurality of projection devices to adjust the overall luminance of the plurality of tiled images on the display surface further comprises:
    adjusting the light source of at least one of the plurality of projection devices to adjust the overall luminance to match the luminance of the dimmed at least one of the plurality of tiled images.

6. The method of claim 2 wherein each of the plurality of projection devices comprises a video signal with at least one video signal value wherein utilizing at least one of the plurality of projection devices to adjust the overall luminance of the plurality of tiled images on the display surface further comprises:
    adjusting at least one of the video signal values of at least one of the plurality of projection devices to adjust the overall luminance to match the luminance of the dimmed at least one of the plurality of tiled images.

7. The method of claim 1 wherein correcting a luminance non-uniformity of the plurality of tiled images further comprises:
    minimizing a luminance difference between a non-dimmed at least one of the plurality of tiled images and the dimmed at least one of the plurality of tiled images.

8. A non-transitory computer program product for correcting luminance non-uniformity in a tiled projection system, the computer program product comprising a non-transitory computer readable medium having computer readable program means for causing a computer to perform the steps of:
    projecting with a plurality of projection devices a composite image wherein the composite image comprises a plurality of tiled images on a display surface with an overall luminance, each of the plurality of tiled images being projected by an associated first projection device and an associated second projection device redundant with the associated first projection device; and
    correcting a luminance non-uniformity of the plurality of tiled images, wherein the luminance non-uniformity is based on a dimmed at least one of the plurality of tiled images resulting from a first energy output of the associated first projection device associated with the dimmed at least one of the plurality of tiled images, wherein correcting the luminance non-uniformity comprises raising energy output of the associated second projection device associated with the dimmed at least one of the plurality of tiled images.

9. The computer program product of claim 8 wherein the dimmed at least one of the plurality of tiled images is associated comprises a luminance and utilizing at least one of the plurality of projection devices to adjust the overall luminance of the plurality of tiled images on the display surface further comprises:
    utilizing at least one of the plurality of projection devices to lower the overall luminance to match the luminance of the dimmed at least one of the plurality of tiled images.

10. The computer program product of claim 9 wherein utilizing at least one of the plurality of projection devices to lower the overall luminance to match the luminance of the dimmed at least one of the plurality of tiled images further comprises:
    utilizing at least one of the non-dimmed plurality of projection devices to blend the overall luminance to match the luminance of the dimmed at least one of the plurality of tiled images.

11. The computer program product of claim 9 wherein each of the plurality of projection devices comprises an optical aperture and utilizing at least one of the plurality of projection devices to lower the overall luminance to match the luminance of the dimmed at least one of the plurality of tiled images further comprises:

adjusting the optical aperture of at least one of the plurality of projection devices to adjust the overall luminance to match the luminance of the dimmed at least one of the plurality of tiled images.

12. The computer program product of claim 9 wherein each of the plurality of projection devices comprises a light source wherein utilizing at least one of the plurality of projection devices to adjust the overall luminance of the plurality of tiled images on the display surface further comprises:

adjusting the light source of at least one of the plurality of projection devices to adjust the overall luminance to match the luminance of the dimmed at least one of the plurality of tiled images.

13. The computer program product of claim 9 wherein each of the plurality of projection devices comprises a video signal with at least one video signal value wherein utilizing at least one of the plurality of projection devices to adjust the overall luminance of the plurality of tiled images on the display surface further comprises:

adjusting at least one of the video signal values of at least one of the plurality of projection devices to adjust the overall luminance to match the luminance of the dimmed at least one of the plurality of tiled images.

14. The computer program product of claim 8 wherein correcting a luminance non-uniformity of the plurality of tiled images further comprises:

minimizing a luminance difference between a non-dimmed at least one of the plurality of tiled images and the dimmed at least one of the plurality of tiled images.

15. A multi-projector system comprising:

a plurality of projection devices;

a tiled display including a plurality of display tiles for displaying a substantially tiled image, wherein each of the plurality of display tiles is configured to receive a projected image from a first projection device of the plurality of projection devices and to receive the projected image from a second projection device of the plurality of projection devices and wherein the tiled display comprises an overall luminance;

a processing unit coupled to the at least two projection devices and the tiled display wherein the processing unit includes logic for correcting a luminance non-uniformity of the plurality of display tiles, wherein the luminance non-uniformity is based on a dimmed one of the plurality of display tiles resulting from a first energy output of the first projection device associated with the dimmed at least one of the plurality of display tiles, wherein correcting the luminance non-uniformity comprises raising energy output of the second projection device associated with the dimmed at least one of the plurality of display tiles.

16. The system of claim 15 wherein the dimmed at least one of the plurality of tiled images is comprises a luminance and utilizing at least one of the plurality of projection devices to adjust the overall luminance of the plurality of tiled images on the display surface further comprises:

utilizing at least one of the plurality of projection devices to lower the overall luminance to match the luminance of the dimmed at least one of the plurality of tiled images.

17. The system of claim 16 wherein utilizing at least one of the plurality of projection devices to lower the overall luminance to match the luminance of the dimmed at least one of the plurality of tiled images further comprises:

utilizing at least one of the non-dimmed plurality of projection devices to blend the overall luminance to match the luminance of the dimmed at least one of the plurality of tiled images.

18. The system of claim 16 wherein each of the plurality of projection devices comprises an optical aperture and utilizing at least one of the plurality of projection devices to lower the overall luminance to match the luminance of the dimmed at least one of the plurality of tiled images further comprises:

adjusting the optical aperture of at least one of the plurality of projection devices to adjust the overall luminance to match the luminance of the dimmed at least one of the plurality of tiled images.

* * * * *